(12) United States Patent
Bell et al.

(10) Patent No.: US 11,329,429 B2
(45) Date of Patent: May 10, 2022

(54) ELECTRICAL INTERFACE FASTENERS

(71) Applicant: HEWLETT-PACKARD DEVELOPMENT COMPANY, L.P., Spring, TX (US)

(72) Inventors: Jeffrey F. Bell, Corvallis, OR (US); Rosanna L. Bigford, Corvallis, OR (US); Alan R. Arthur, Corvallis, OR (US); Paul Allan Osborne, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/500,428

(22) PCT Filed: Sep. 22, 2017

(86) PCT No.: PCT/US2017/052917
§ 371 (c)(1),
(2) Date: Oct. 3, 2019

(87) PCT Pub. No.: WO2019/059924
PCT Pub. Date: Mar. 28, 2019

(65) Prior Publication Data
US 2021/0119380 A1    Apr. 22, 2021

(51) Int. Cl.
*H01R 13/629* (2006.01)
*B33Y 30/00* (2015.01)
(Continued)

(52) U.S. Cl.
CPC ........ *H01R 13/62988* (2013.01); *B33Y 30/00* (2014.12); *B33Y 99/00* (2014.12);
(Continued)

(58) Field of Classification Search
None
See application file for complete search history.

(56) References Cited

U.S. PATENT DOCUMENTS

| 4,858,309 A | 8/1989 | Korsunsky et al. |
| 4,947,115 A | 8/1990 | Siemon |

(Continued)

FOREIGN PATENT DOCUMENTS

| CN | 1125513 C | 10/2003 |
| CN | 1672299 | 9/2005 |

(Continued)

*Primary Examiner* — Felix O Figueroa
(74) *Attorney, Agent, or Firm* — Fabian VanCott

(57) ABSTRACT

A mechanical fastener for an electrical interface may include a first handle and a second handle The first handle and second handle are located on opposite sides of the mechanical fastener. The mechanical fastener may also include a first housing, a second housing coupled to the first housing, an electrical interface housed in the mechanical fastener between the first and second housings, a first lever intermediary between the first handle and the first housing and mechanically coupled to the second handle, a second lever intermediary between the second handle and the second housing and mechanically coupled to the first handle, a first post coupled to the first handle and the second lever, and a second post coupled to the second handle and the first lever.

20 Claims, 7 Drawing Sheets

(51) Int. Cl.
  *B33Y 99/00* (2015.01)
  *H01R 12/70* (2011.01)
  *H01R 12/79* (2011.01)
(52) U.S. Cl.
  CPC ......... *H01R 12/7058* (2013.01); *H01R 12/79* (2013.01); *H01R 13/62922* (2013.01); *H01R 13/62972* (2013.01)

(56) References Cited

U.S. PATENT DOCUMENTS

| | | | |
|---|---|---|---|
| 5,035,634 A * | 7/1991 | Hasircoglu | H01R 13/62972 439/157 |
| 5,219,459 A * | 6/1993 | Kaneko | H01R 13/629 439/153 |
| 5,848,906 A | 12/1998 | Glusker | |
| 6,146,176 A | 11/2000 | Hardee | |
| 6,305,959 B1 | 10/2001 | Baker et al. | |
| 6,663,412 B2 | 12/2003 | Aramoto et al. | |
| 7,066,763 B1 | 6/2006 | Corwin | |
| 7,094,081 B1 | 8/2006 | Senk et al. | |
| 7,252,537 B2 | 8/2007 | Simon | |
| 7,287,828 B2 | 10/2007 | Silverbrook et al. | |
| 7,575,451 B1 | 8/2009 | Jaramillo et al. | |
| 9,692,153 B1 | 6/2017 | Rodriguez et al. | |
| 2013/0040483 A1 | 2/2013 | Ngo et al. | |
| 2014/0187068 A1 * | 7/2014 | Chia | H01R 13/62972 439/160 |
| 2020/0243999 A1 * | 7/2020 | Bell | H01R 13/62988 |

FOREIGN PATENT DOCUMENTS

| | | |
|---|---|---|
| CN | 1812199 | 8/2006 |
| CN | 203166226 | 8/2013 |
| DE | 19611873 | 10/1997 |
| EP | 0137972 A1 | 4/1985 |
| EP | 2863482 A1 | 4/2015 |
| SU | 729702 | 4/1980 |
| SU | 1120434 | 10/1984 |
| WO | WO2017083734 | 5/2017 |
| WO | WO-2017083734 A1 | 5/2017 |

* cited by examiner

ELECTRICAL INTERFACE FASTENERS

BACKGROUND

Electrical interfaces may be any electro-mechanical device used to join electrical terminations and create an electrical circuit. In some examples, electrical interfaces provide for the coupling of a number of electric devices such as computing devices to one another, and may use any of a large number of electrical interface standards. These electrical interfaces may include male and female interfaces that mechanically and electrically couple at least one wire coupled to each of the male and female interfaces. The coupling of the male and female interfaces may be temporary, may use a tool for assembly and removal, or may serve as a permanent electrical joint between the at least two wires or between the devices. Further, the electrical interfaces may be manufactured to carry power, signals, control applications, or combinations thereof.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
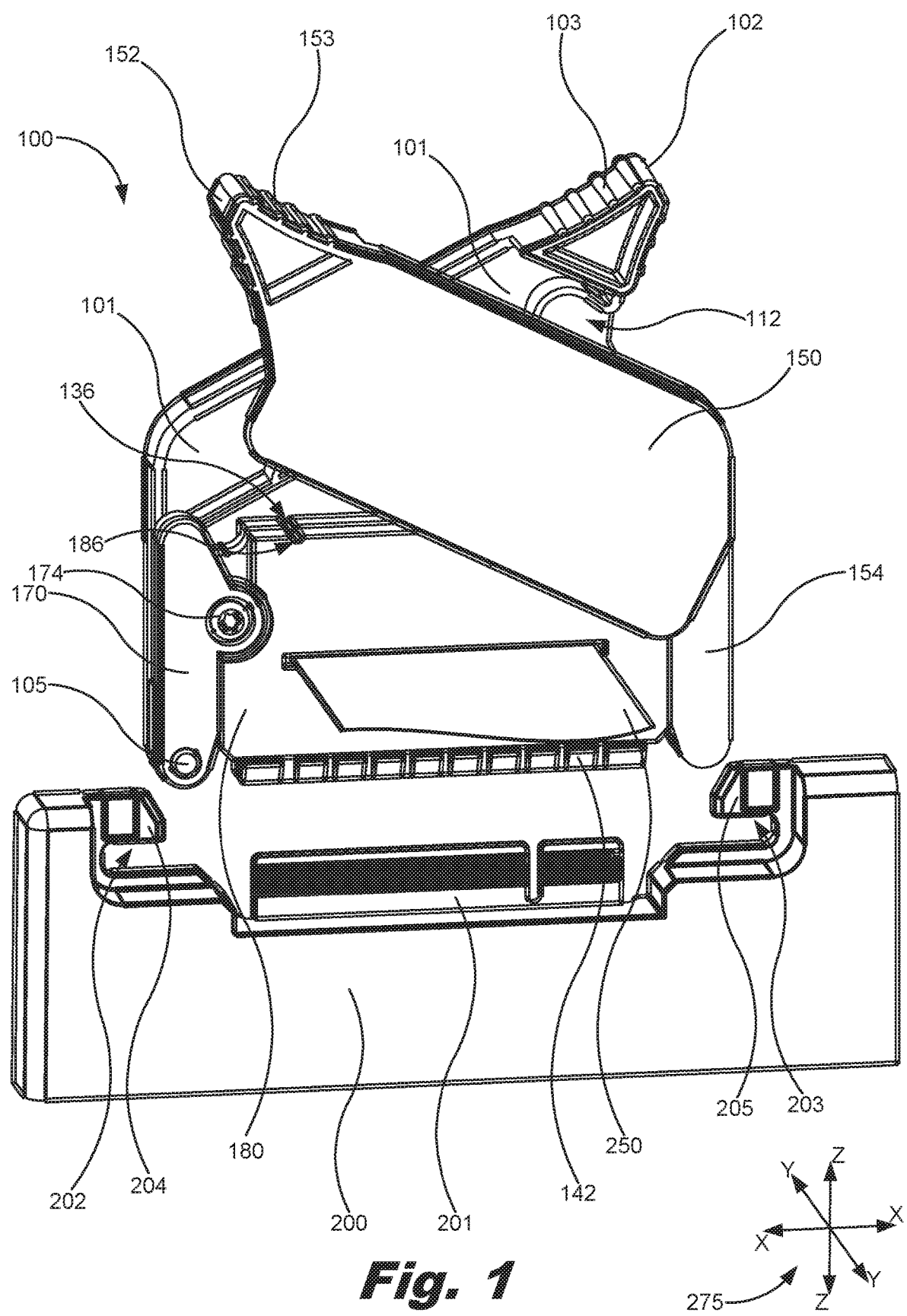
FIG. 1 is an isometric view of an electrical interface system in an uncoupled state, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, electrical interfaces may include male and female interfaces that mechanically and electrically couple at least one wire coupled to each of the male and female interfaces. For example, edge connectors are the portion of a printed circuit board (PCB) that include a number of traces leading to the edge of the PCB that plug into a matching socket. An edge connector reduces costs in manufacturing an electrical interface because it utilizes a single discrete female portion of the connector with the male portion of the connector being formed out of the edge of the PCB. Further, edge connectors also tend to be fairly robust and durable.

Edge connectors may be used in, for example, a printing device such as a three-dimensional (3D) additive manufacturing apparatus, to couple a material ejection device such as a printhead, print bar, or pen to the data processing hardware and power sources used to drive the pen. In some situations, such as in a 3D additive manufacturing apparatus, the material ejection device may be suspended above a print zone where the material ejection device deposits materials used in a 3D additive manufacturing process. The material ejection device may be suspended using a carriage that moves the material ejection device across the width and height of the print zone. The carriage may be supported by a number of bearings and other support devices that support the carriage and the material ejection device.

In this example, when a user seeks to couple the female portion of an edge connector to a male portion of the edge connector electrically and mechanically to the material ejection device, the user may not properly align the female portion of the connector to the male portion of the connector. This may lead to damage to the edge connector. Further, the user may not be able to visually confirm that the edge connector is connected to the material ejection device, and may use more force than necessary to couple the male and female portions. This increase in force by the user on the electrical interface, in turn, places additional force on the underlying structures including, for example, a carriage system, a bearing system, or other structures used to support the material ejection device. Still, further, the user may not have tactile confirmation that the female portion of the edge connector is properly coupled and seated to the male portion, and may increase the force on the female portion of the edge connector for this reason as well. Thus, in some situations including consumer applications, the forces used to couple the female and male portions of the edge card connector may exceed ergonomic limits, and the applied forces may easily outstrip the connectors ability to safely withstand those forces as well as the underlying system's and structures' ability to withstand those forces.

Examples described herein provide a mechanical fastener for an electrical interface. The mechanical fastener may include a first handle and a second handle. The first handle and second handle are located on opposite sides of the mechanical fastener. The mechanical fastener may also include a first housing, a second housing coupled to the first housing, an electrical interface housed in the mechanical fastener between the first and second housings, a first lever intermediary between the first handle and the first housing and mechanically coupled to the second handle, a second lever intermediary between the second handle and the second housing and mechanically coupled to the first handle, a first post coupled to the first handle and the second lever, and a second post coupled to the second handle and the first lever.

The first and second handles may each include knurling located at a proximal end while the first and second posts are located at a distal end. The first and second posts couple to a main printed circuit board (PCB) housing during coupling of the mechanical fastener to the main PCB housing.

The electrical interface includes an intermediary printed circuit board (PCB), a ribbon cable connector mechanically coupled to the intermediary PCB, and a female edge connector mechanically coupled to the intermediary PCB and communicatively coupled to the intermediary PCB. The electrical interface may be a peripheral component interconnect express (Rae) edge card electrical interface.

Each of the first and second handles include a registration pillar, an arched track, and a number of protrusions formed on the arched track. A first registration pillar may be coupled to the first handle interface with a second arched track and second set of protrusions formed on the second arched track of the second handle. A second registration pillar may be coupled to the second handle interface with a first arched track and first set of protrusions formed on the first arched track of the first handle. During actuation, the first handle and second handle rotate in opposite directions relative to one another. At least one of the first and second housing includes a ribbon cable aperture defined therein through which a ribbon cable couples to the ribbon cable connector.

Examples described herein also provide a three-dimensional (3D) additive manufacturing apparatus. The 3D additive manufacturing apparatus may include at least one material ejection device to eject material onto a print zone, and an electrical interface system to electrically couple the material ejection device to control circuitry of the 3D additive manufacturing apparatus. The electrical interface system may include a mechanical fastener. The mechanical fastener may include a first handle and a second handle. The first handle and second handle may be located on opposite sides of the mechanical fastener and pivot in opposite directions with respect to one another. The mechanical fastener may also include a first housing, a second housing coupled to the first housing, a first electrical interface housed in the mechanical fastener between the first and second housings, a first lever between the first handle and the first housing and mechanically coupled to the second handle, a second lever between the second handle and the second housing and mechanically coupled to the first handle, a first post coupled to the first handle and the second lever, and a second post coupled to the second handle and the first lever. The electrical interface system may also include a number of hooks formed in a housing of the material ejection device to which the mechanical fastener couples.

The hooks may include a first hook formed in a coupling structure to which the mechanical fastener couples, and a second hook formed in the coupling structure opposite from the first hook with respect to a second electrical interface of the coupling structure.

Actuation of the mechanical fastener simultaneously causes the first and second posts to engage the first and second hooks and the first electrical interface to engage with the second electrical interface. The first electrical interface and second electrical interface may include peripheral component interconnect express (PCIe) edge card electrical interfaces. The coupling structure may be coupled to a print bar.

Examples described herein also provide a camlock connector for an edge card electrical connector. The camlock connector may include two handles located on opposite sides of the camlock connector and pivotable about parallel axis in opposite directions relative to one another, a housing, an electrical interface housed within the housing, and two cams coupled to each of the handles to transforming pivoting motion of the handles into movement of at least two posts coupled to the handles into an engaged position.

The camlock connector may also include a registration pillar formed on each of the two handles, an arched track, and a number of protrusions formed on the arched track. A first registration pillar may be coupled to the first handle interfaces with a second arched track and second set of protrusions formed on in the second arched track of the second handle, and a second registration pillar may be coupled to the second handle interfaces with a first arched track and first set of protrusions formed on the first arched track of the first handle. The housing may include a ribbon cable aperture defined therein through which a ribbon cable couples to the electrical interface.

Figure 2:
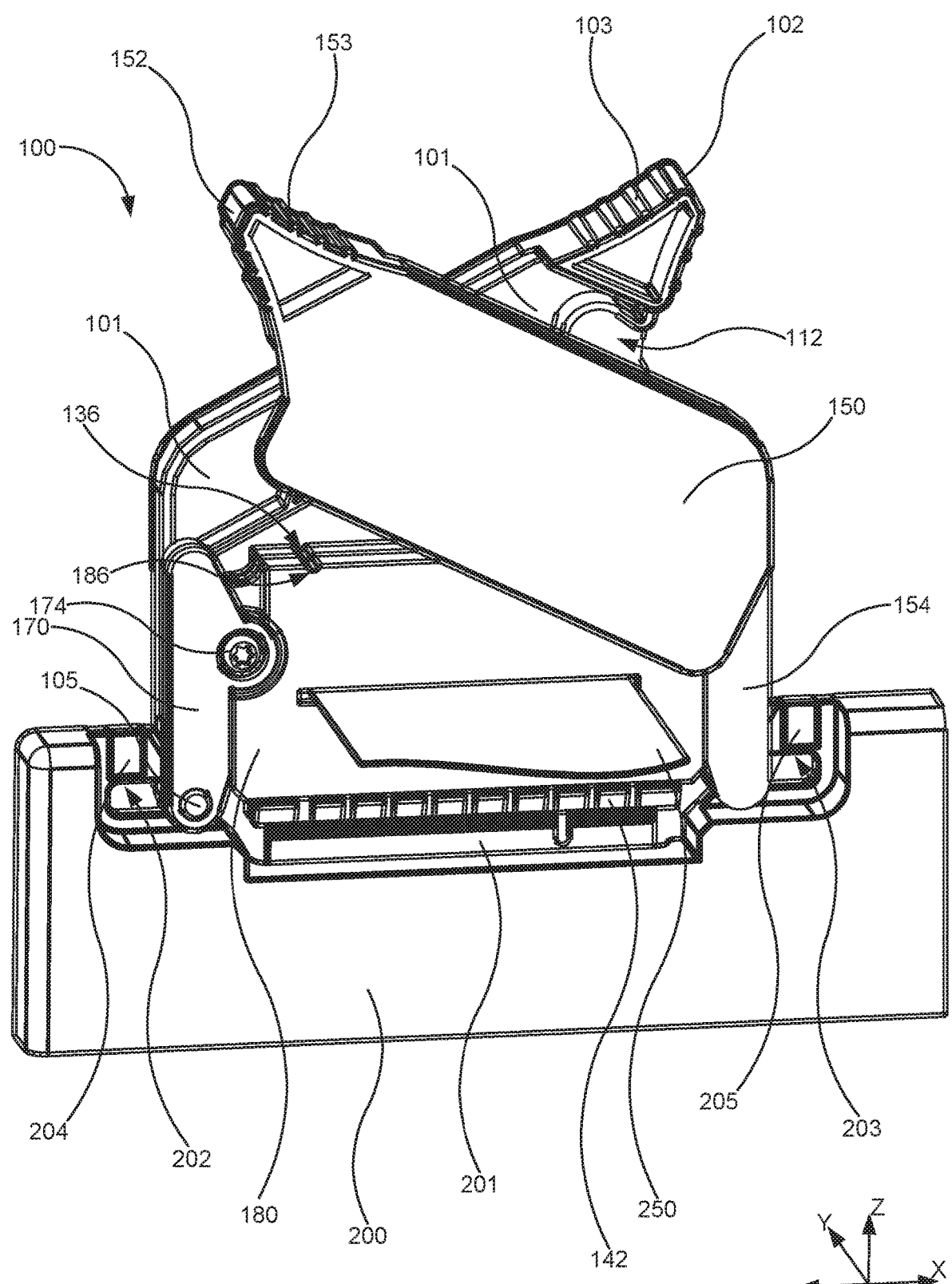
FIG. 2 is an isometric view of an electrical interface system in an intermediate state between an uncoupled state and a coupled state, according to an example of the principles described herein.
Figure 3:
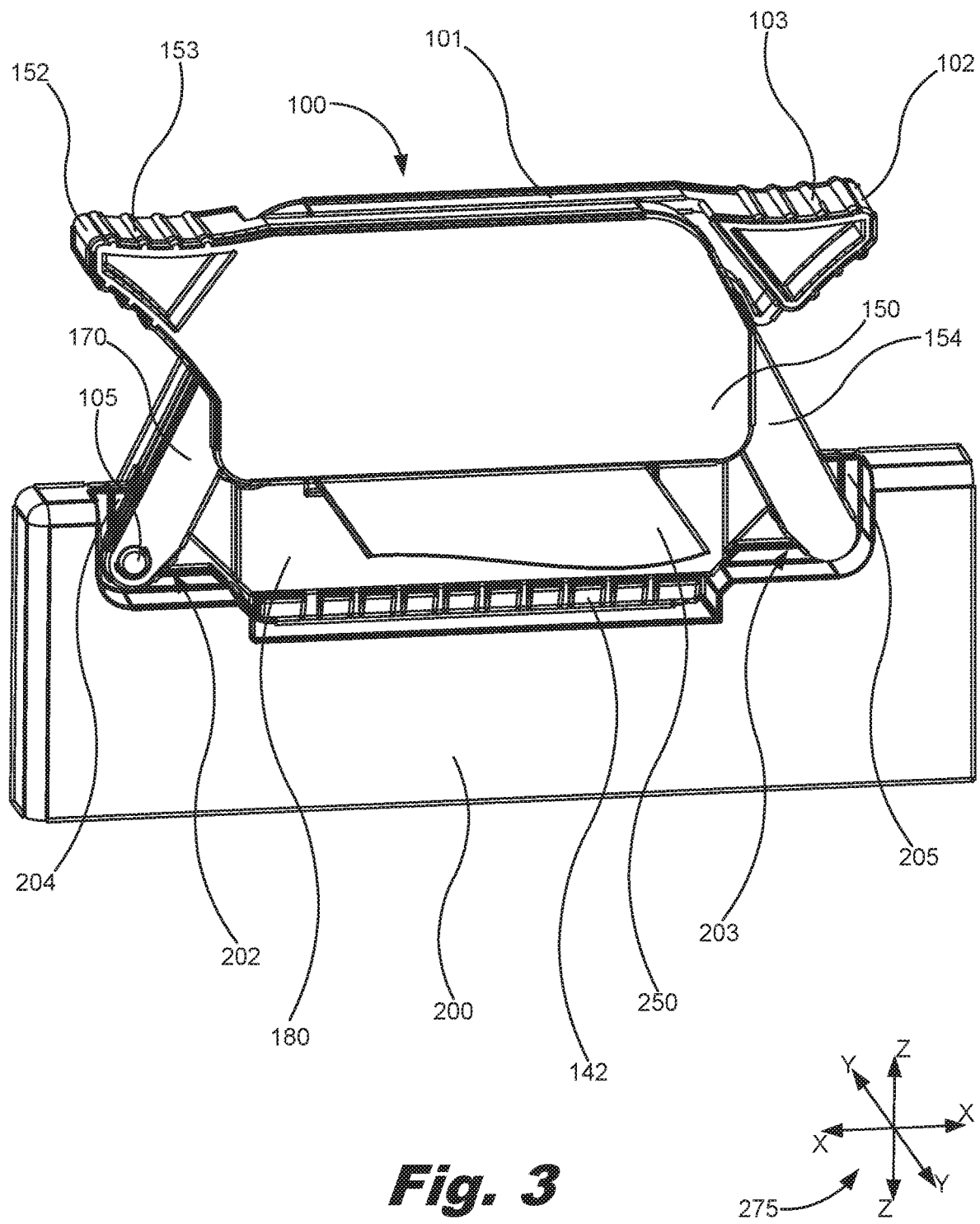
FIG. 3 is an isometric view of an electrical interface system in a coupled state, according to an example of the principles described herein.

Turning now to the figures, FIG. 1 is an isometric view of an electrical interface system in an uncoupled state, according to an example of the principles described herein, Further, FIG. 2 is an isometric view of the electrical interface system of FIG. 1 in an intermediate state between an uncoupled state and a coupled state, according to an example of the principles described herein. Still further, FIG. 3 is an isometric view of the electrical interface system of FIGS. 1 and 2, in a coupled state, according to an example of the principles described herein. The electrical interface system may include a camlock connector (100) including one half of the electrical interface system, and a base (200) including the other half of the electrical interface system to which the camlock connector (100) couples. In the examples described herein, the camlock connector (100) includes a female portion of an electrical interface, and the base (200) includes a male portion of the interface. However, in one example, the camlock connector (100) may include the male portion of the electrical interface, and the base (200) may include the female portion of the electrical interface. Further, in the examples described herein, the base (200) and camlock connector (100) include an edge connector (201) and its mating female interface (142), respectively. An edge connector (201) may be any portion of a printed circuit board (PCB) that includes a number of traces leading to the edge of the PCB that are intended to plug into a matching socket of the mating female interface (142). However, any type of electrical interface may be integrated into the camlock connector (100) and base (200).

As depicted in the series of FIGS. 1 through 3, the camlock connector (100) is coupled to the base (200) by bringing the camlock connector (100) into an initial position as depicted in FIG. 1. In the state depicted in FIG. 1, the camlock connector (100) is not touching any portion of the base (200). In this state, the user provides a general alignment of the camlock connector (100) relative to the base (200). In FIG. 2, however, the camlock connector (100) is seated on the base (200) but is not engaged with the base (200). This is achieved by the user moving the camlock connector (100) in the downward z-direction as indicated by the coordinate indicator (275). With the camlock connector (100) seated on the base (200), alignment is achieved by use of posts (105, 155), arms (104, 154), cam levers (120, 170), and other elements of the camlock connector (100) that align with elements of a housing of the base (200).

In FIG. 3, the camlock connector (100) is actuated such that the camlock connector (100) is engaged with and coupled to the base (200). In one example, the camlock connector (100) couples to the base (200) by movement of the posts (105, 155), arms (104, 154), cam levers (120, 170), and other elements of the camlock connector (100) outwards in the x-direction as indicated in by the coordinate indicator (275). This movement causes the posts (105, 155) to engage with corresponding lateral voids (202, 203) defined in the housing of the base (200). A number of hooks (204, 205) formed from the base (200) due to the inclusion of the lateral voids (202, 203) provide a structure around the posts (105, 155) that secure the posts (105, 155) to the base (200). More details regarding the structure and functioning of the camlock connector (100) will now be provided in connection with the description of FIG. 4 along with FIGS. 1 through 3.

Figure 4:
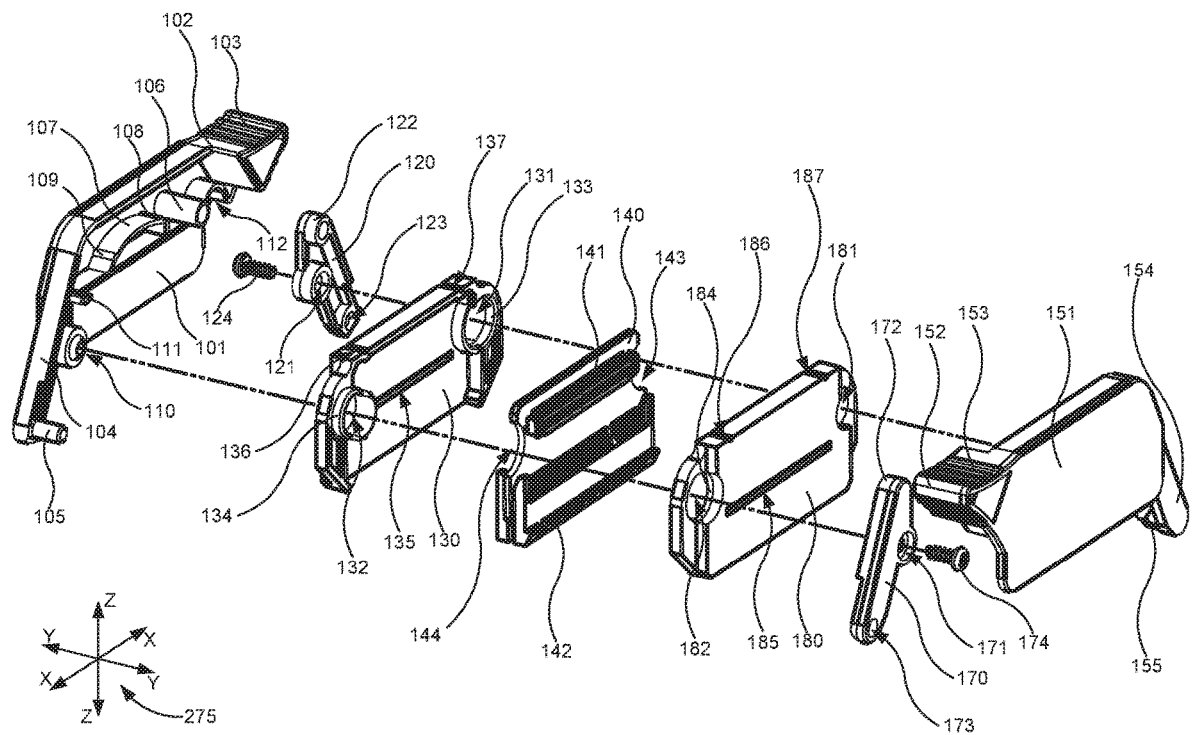
FIG. 4 is an exploded, isometric view of an electrical interface, according to an example of the principles described herein.

FIG. 4 is an exploded, isometric view of an electrical interface, according to an example of the principles described herein. Specifically, FIG. 4 depicts the various elements of the camlock connector (100). In one example, the camlock connector (100) may include a number of identical or near identical parts that are coupled to one another in opposite orientations. These identical or near identical parts are reverse-mirror images of one another. Using these identical or near identical, but reverse-mirror image parts that couple to one another decreases the costs associated with manufacturing since fewer unique parts are manufactured. These identical or nearly identical parts that fit together or couple to one another in a complimentary manner to form the camlock connector (100). For example, and to begin describing the elements of the camlock connector (100) of FIG. 4, the camlock connector (100) may include two handles (101, 151). The first handle (101) is an identical part with respect to the second handle (151), but is oriented in an opposite direction with respect to the second handle (151). Several other elements of the camlock connector (100) are arranged as reverse-mirror image parts, and these elements are described herein. Thus, throughout the description of FIG. 4, those elements depicted in the interior portion of the left handle (101) are included in the right handle (151), but are not depicted in FIG. 4.

Each of the handles (101, 151) may include a knob (102, 152) with which a user uses to apply force on the handles (101, 151). The force may be applied in the z-direction as indicated by the coordinate indicator (275), and this force, as is described herein, results in the movement of the handles (101, 151) in the z-direction, and the coupling of the camlock connector (100) to the base (200). On one example, the knobs (102, 152) may include knurling (103, 153) to allow the user to apply relatively more force on the handles (101, 151) using the increased frictional forces between the user's fingers or hand and the handles (101, 151) of the camlock connector (100) than may be provided by the otherwise smooth surface. In one example, the knurling (103, 153) may be located on both an upper side of the knobs (102, 152) as well as an underside of the knobs (102, 152) in order to allow as user to better grip the knobs (102, 152) to both engage and disengage the camlock connector (100).

Each of the handles (101, 151) also includes an arm (104, 154) that extends away from a main body of the handle (101, 151). Each arm (104, 154) includes a post (105, 155) formed thereon or coupled thereto. Each post (104, 154) protrudes in a direction perpendicular to the direction of extension of its corresponding arm (104, 154) and in a direction perpendicular to the hooks (204, 205) formed from the base (200). This allows the posts (105, 155) to be moved into the lateral voids (202, 203) defined in the base (200) and engage with the hooks (204, 205). The engagement of the posts (105, 155) in this manner results in the coupling of the camlock connector (100) to the base (200) and, in turn, the coupling of the female interface (142) of the camlock connector (100) to the male edge connector (201) of the base (200).

The camlock connector (100) may further include a first (130) and a second (180) housing. The housings (130, 180) are used to house a printed circuit assembly (PCA) (140). The housings (130, 180), when coupled around the PCA (140), provide a number of conduits to be defined therethrough by a number of first (132, 181) and second (131, 182) apertures defined therein. A number of fasteners (124, 174) may extend through the first (132, 181) and second (131, 182) apertures to couple the various elements of the camlock connector (100) together. In one example, the first apertures (132, 181) may be formed differently with respect to the second apertures (131, 182) such that a first interior ring (134) formed around the first apertures (132, 181) is smaller relative to a second interior ring (133) formed around the second apertures (131, 182). In this manner, the first interior ring (134) is able to fit within the corresponding second interior ring (133) such that their fit is a mating fit. Thus, when the housings (130, 180) are coupled together, the first interior ring (134) mates with the second interior ring (133). In one example, the first interior ring (134) mates with the second interior ring (133) using an interference fit, a press fit, a friction fit, or any other engineering fit that causes the first interior ring (134) to couple to the second interior ring (133).

A third aperture (135, 185) may be defined in the housings (130, 180). This third aperture (135, 185) is located in a middle portion of each of the housings (130, 180), and is dimensioned to allow one or more cables such as a ribbon cable (250) to couple to an interface of the RCA (140) through the third aperture (135, 185) of the housing (130, 180). As with other elements in the camlock connector (100), the housings (130, 180) may be manufactured as reverse-mirror images of one another such that both housings (130, 180) include a third aperture (135, 185) defined therein even when one of the two third apertures (135, 185) may not be used. Again, this reduces costs associated with an otherwise relatively more expensive and more complicated design of two separate and unique housings (130, 180), The PCA (140) includes a ribbon cable interface (141) electrically coupled through the PCA (140) to a female interface (142). The ribbon cable interface (141) may be any interface that accepts a multi-wire planar cable that includes a plurality of conducting wires running parallel to each other on the same flat plane. In this manner, the ribbon cable (250) that couples to the ribbon cable interface (141) may do so via the flat third aperture (135, 185) defined in the housing (130, 180). Thus, the female interface (142) is electrically coupled to a ribbon cable (250) through the PCA (140) and ribbon cable interface (141). In the example of FIGS. 1 through 4, the ribbon cable (250) protrudes from the housings (130, 180) perpendicular to the face of the RCA (140) and in the y-direction. However, the ribbon cable interface (141) and the third apertures (135, 185) may be arranged within the camlock connector (100) to allow the ribbon cable (250) to protrude from the camlock connector (100) in a different direction.

The RCA (140) may include any shape that allows the RCA (140) to fit within the housings (130, 180). For example, a recess (143, 144) may be defined within the PCA (140) at a point at which the first interior ring (134) and second interior ring (133) mate in order to provide space for the coupling of the housings (130, 180) together around the PCS (140).

A cam lever (120, 170) may be included between each handle (101, 151) and housing (130, 180). The cam levers (120, 170) cause the coaxial rotational movement of the handles (101, 151) to be transformed into the linear movement of the posts (105, 155) into and out of the lateral voids (202, 203), and, at the same time, causes the housings (130, 180) and RCA (140) to move in the z-direction to engage and disengage to and from the edge connector (201) of the base (200). In order to achieve these purposes, the cam levers (120, 170) are coupled to handles (101, 151) on respective opposite sides therefrom using the fasteners (124, 174). Each cam lever (120, 170) include a fastener conduit (121) through which the respective fastener (124, 174) is threaded into a fastener anchor point (110) located on each of the handles (101, 151). In this manner, the housings (130, 180) and PCA (140) are rotationally coupled to the handles (101, 151). The fastener conduits (121) rotate within the first (132, 181) and second (131, 182) apertures defined in the housings (130, 180).

Each cam lever (120, 170) includes a post aperture (123, 173) that engages with the posts (105, 155) of the handles (101, 151) to which the cam lever (120, 170) is coupled to using the fasteners (124, 174), respectively. The posts (105, 155) fit within the post apertures (123, 173), and a space is created between each of the arms (104, 154) and the cam levers (120, 170) to allow the posts (105, 155) to enter the corresponding lateral voids (202, 203) defined in the base (200) while the arms (104, 154) and the cam levers (120, 170) move past the hooks (204, 205) as depicted in, for example, FIG. 3. Stated another way, the arms (104, 154) and the cam levers (120, 170) are offset from one another such that the hooks (204, 205) may be inserted therebetween as the camlock connector (100) couples to the base (200), The cam levers (120, 170) include a buttress end (122, 172) that seats within a buttress recess (112) defined within each of the handles (101, 151) when the camlock connector (100) is engages with the base (200) as depicted in FIG. 3. The buttress ends (122, 172) seat within the buttress recess (112) to stop the rotation of the handles (101, 151). In a similar manner, a number of protrusions (111) formed on or coupled to the handles (101, 151) seat within a number of protrusion recesses (136, 137, 186, 187) defined in the first (130) and a second (180) housings. The seating of the protrusions (111) within the protrusion recesses (136, 137, 186, 187) also serves to stop the rotation of the handles (101, 151) at the point at which the camlock connector (100) is in the state depicted in FIG. 3.

Each handle (101, 151) includes a number of elements that assist in the incremental rotation of the handles (101, 151) about parallel axis. The handles (101, 151) each rotate about a center defined by an arched track (107). A registration pillar (106) is included on the interior of each handle (101, 151) adjacent the arched track (107). When the elements of the camlock connector (100) are coupled together as depicted in FIGS. 1 through 3, the registration pillar (106) of the first handle (101) interfaces with the arched track (107) included on the second handle (151), and the registration pillar (106) of the second handle (151) interfaces with the arched track (107) included on the first handle (101). A number of protrusions (108, 109) are formed or otherwise included on the outer surface of the arched track (107). The protrusions (108, 109) act as stops such that as the registration pillars (106) move along the surface of the arched tracks (107), additional force is applied to cause the registration pillars (106) to move over the profiles of the protrusions (108, 109). The arched track (107), registration pillars (106), and protrusions (108, 109) are positioned and dimensioned such that once the registration pillars (106) are moved over the protrusions (108, 109), the registration pillars (106) will not move back over the protrusions (108, 109) without additional force being applied. In this manner, the handles (101, 151) are able to remain in a disengaged state as depicted in FIGS. 1 and 2 or an engaged state as depicted in FIG. 3 using the protrusions (108, 109). Any number of protrusions (108, 109) may be included on the arched track (107) to provide discrete stop positions along the rotational motion of the handles (101, 151). However, at least two protrusions (108, 109) as depicted in FIG. 4 are included in order to stop the movement of the handles (101, 151) between a fully disengaged state and a fully engaged state.

The interaction between the registration pillars (106) and the protrusions (108, 109) on the arched track (107) provide haptic feedback to a user as to when the camlock connector (100) is in an engaged or disengaged state. As the registration pillars (106) move over the profiles of the protrusions (108, 109), a user can feel the change in forces between the registration pillars (106) and the protrusions (108, 109), and can appreciate the engagement and disengagement points of the camlock connector (100).

Further, the arched tracks (107) and the engagement of the registration pillars (106) with the opposite side's arched track (107) results in the synchronized movement of the handles (101, 151) since one registration pillar (106) of the first handle (101) is located along the same portion of the arched track (107) of the second handle (151) as is the other registration pillar (106) of the second handle (151) is with respect to the arched track (107) of the first handle (101). Using this synchronization of the movement of the handles, a user may be able to visually confirm when the camlock connector (100) is engaged and disengaged by viewing whether or not the handles (101, 151) are or are not parallel with one another as depicted in FIG. 3. Further, in one example, force may be applied to a single handle (101, 151) and not the other to engage or disengage the camlock connector (100).

Using FIGS. 1 through 4, the function of the camlock connector (100) will now be described. The user may bring the camlock connector (100) into general alignment with the base (200) as depicted in FIG. 1. The camlock connector (100) may then be lowered in the z-direction such that the posts (105, 155) touch or rest on the top surface of the base (200) to the interior side of the lateral voids (202, 203) defined in the housing of the base (200) as depicted in FIG. 2.

The user may then apply force on the knobs (102, 152) of the handles (101, 151) in the z-direction. Doing so causes the registration pillars (106) to move past the first protrusion (108), along the arched track (107), and past the second protrusion (109). Simultaneously, the posts (105, 155) are moved away from the center of the camlock connector (100) and into their respective lateral voids (202, 203) in the positive and negative x-directions, and the cam levers (120, 170) force the housings (130, 180) and the PCA (140) contained therein downward in the z-direction. In this manner, the user does not directly apply a force in coupling the female interface (142) to the edge connector (201). Instead, the rotational motion of the handles (101, 151) is converted into linear, z-directional motion in the housings (130, 180) and the PCA (140) via the cam levers (120, 170). The action of the cam levers (120, 170) ensures that the user cannot apply too much force onto the interface between the female interface (142) to the edge connector (201), and the buttress ends (122, 172), buttress recesses (112), protrusions (111), and protrusion recesses (136, 137, 186, 187) keep the user from being able to apply too much force on the handles (101, 151) and over-rotating the handles (101, 151).

In order to disconnect the camlock connector (100) from the base (200), the user may apply force on the underside of the knobs (102, 152), and the mechanical actuation of the various elements of the camlock connector (100) occur in the opposite order as described above. Thus, the camlock connector (100) may be removed from and re-engaged with the base (200) any number of times.

Figure 5:
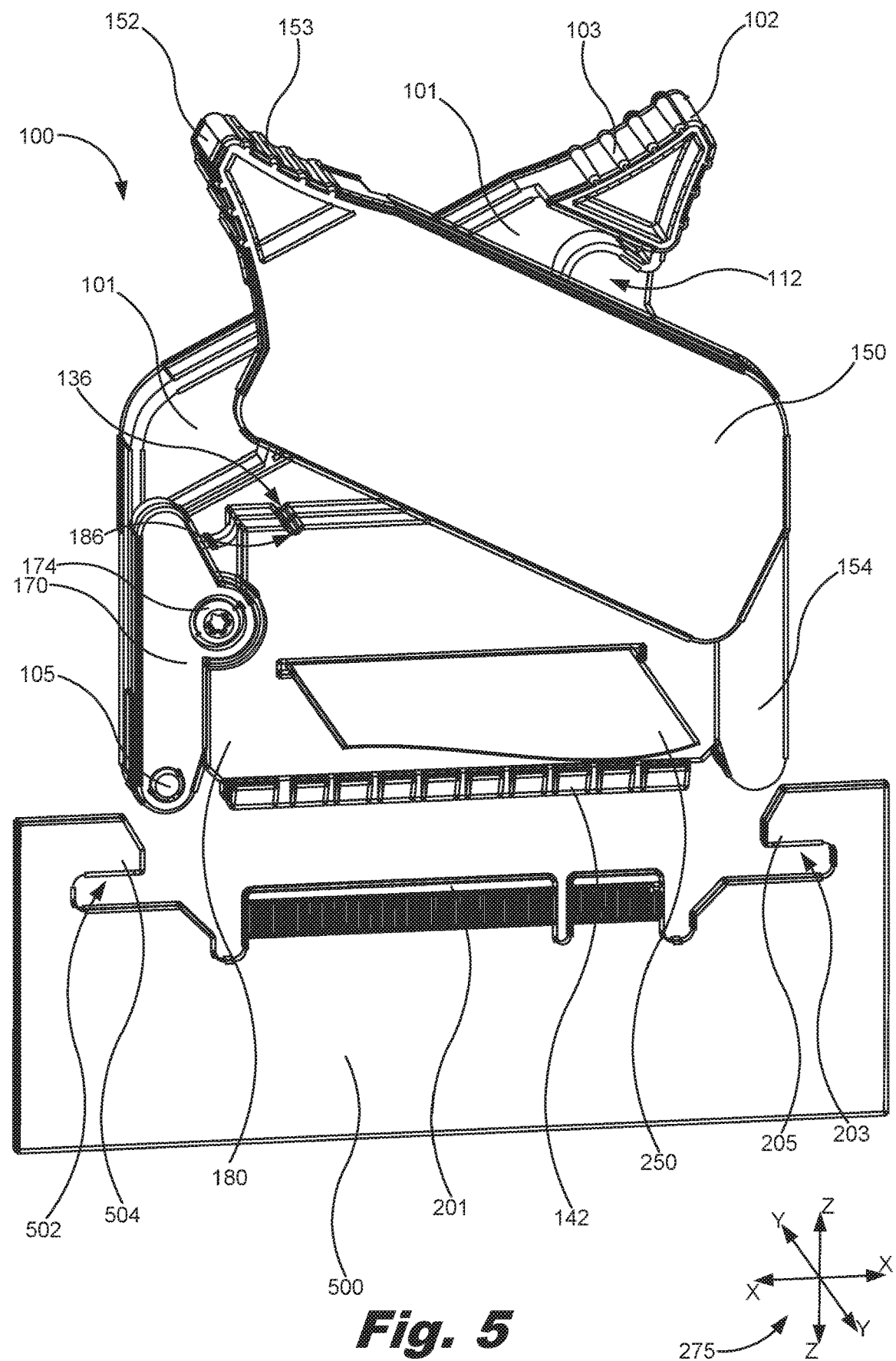
FIG. 5 is an isometric view of an electrical interface system in an uncoupled state, according to another example of the principles described herein.

FIG. 5 is an isometric view of an electrical interface system in an uncoupled state, according to another example of the principles described herein. The electrical interface system of FIG. 5 includes similar elements as compared to the examples depicted and described in relation to FIGS. 1 through 4, including, for example, the camlock connector (100) and the edge connector (201). Therefore, the description of similar elements between FIGS. 1 through 4 and 5 are provided above.

The example of FIG. 5 includes a printed circuit board (PCB) (500) in which a number of hooks (504, 505) and lateral voids (202, 203) are formed and defined within the PCB (500). In this example, the camlock connector (100) engages with the hooks (504, 505) via the posts (105, 155) engaging with the lateral voids (202, 203). The example of FIG. 5 includes less parts such as a housing surrounding the edge connector (201). This decrease in the number of parts results in a less expensive electrical interface.

Figure 6:
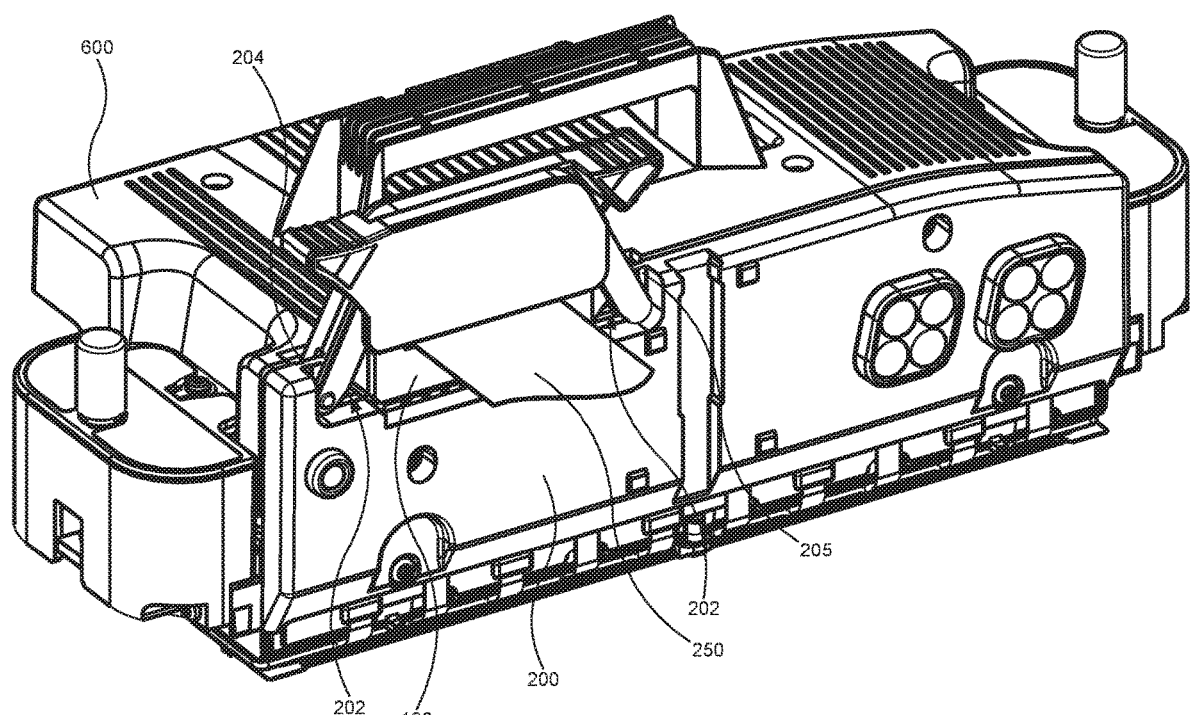
FIG. 6 is an isometric view of an electrical interface system incorporated into a printhead, according to another example of the principles described herein.

FIG. 6 is an isometric view of an electrical interface system incorporated into a printhead (600), according to another example of the principles described herein. The printhead (600) may be any device that ejects fluid. The electrical interface includes the camlock connector (100) and base (200). The base (200) is mechanically integrated into the side of the printhead (600) to allow the camlock connector (100) to couple to the base (200), and provide electrical signals to be sent to the printhead (600) through the ribbon cable (250) and camlock connector (100).

The printhead (600) may be a replaceable element within a printing system such as a 3D printing device, and may use the camlock connector (100) and base (200) to selectively connect to and disconnect from a number of printheads (600) as they are replaced. Use of the camlock connector (100) and base (200) in connection with a printhead (600) ensures that a user does not compromise the integrity of supporting structures like carriages and bearings that support the printhead (600). A user may otherwise exert too much force on the electrical interface causing damage to the underlying support structures. The present camlock connector (100) and base (200) remove the application of direct force on the electrical interface. Although a printhead (600) is depicted in FIG. 6 as the receiving device, any device that has underlying structures that may be damaged through the application of too much force may benefit from the camlock connector (100).

Figure 7:
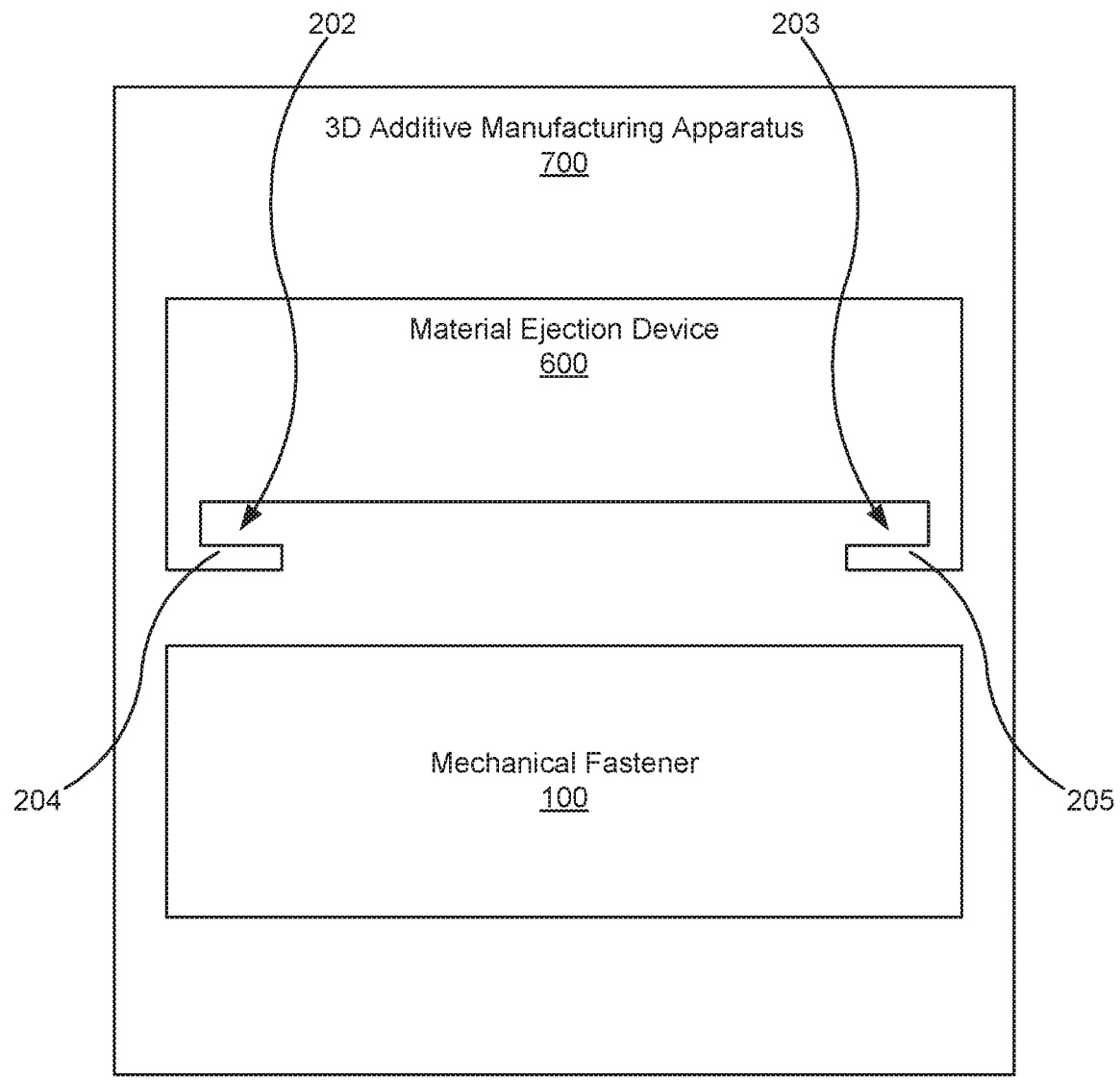
FIG. 7 is a block diagram of a three-dimensional (3D) additive manufacturing apparatus including the electrical interface system of FIGS. 1 through 4, according to another example of the principles described herein.

FIG. 7 is a block diagram of a three-dimensional (3D) additive manufacturing apparatus (700) including the electrical interface system of FIGS. 1 through 4, according to another example of the principles described herein. The 3D additive manufacturing apparatus (700) may include a material ejection device (600) such as the printhead of FIG. 6. The material ejection device (600) ejects material such as build materials onto a substrate or build platform.

The 3D additive manufacturing apparatus (700) may also include an electrical interface system to electrically couple the material ejection device (600) to control circuitry of the 3D additive manufacturing apparatus. The electrical interface system may include a mechanical fastener (100) such as the camlock connector (100) depicted in FIGS. 1 through 6. The mechanical fastener (100) may include a first handle (101), a second handle (151). The first handle (101) and second handle (151) are located on opposite sides of the mechanical fastener (100). Further, the first handle (101) and second handle (151) pivoting in opposite directions with respect to one another as they are actuated.

The mechanical fastener (100) may also include a first housing (130) and a second housing (180) coupled to the first housing. A first electrical interface (140) is housed in the mechanical fastener (100) between the first (130) and second (180) housings. A first lever (120) is located between the first handle (101) and the first housing (130), and is mechanically coupled to the second handle (151) using, for example, a fastener (124). Similarly, a second lever (170) is located between the second handle (151) and the second housing (180). The second lever (170) is mechanically coupled to the first handle (101). The mechanical fastener (100) may also include a first post (105) coupled to the first handle (101) and the second lever (170). A second post (155) is coupled to the second handle (151) and the first lever (120).

The electrical interface system may also include a number of lateral voids (202, 203) defined in a housing of the material ejection device (600) to which the mechanical fastener (100) couples. As described above, the lateral voids (202, 203) are defined in the housing of the material ejection device (600) such that a number of hooks (204, 205) are formed from the housing of the material ejection device (600) such as the base (200) described herein.

In one example, the lateral voids include a first lateral void (202) defined in a coupling structure of the material ejection device (600) to which the mechanical fastener (100) couples. Further, a second lateral void (203) may be defined in the coupling structure opposite from the first lateral void (202) with respect to a second electrical interface (201) of the coupling structure. Actuation of the mechanical fastener (100) simultaneously causes the first (105) and second (155) posts to engage the first (202) and second (203) lateral voids and the first electrical interface (140) to engage with the second electrical interface (201). In one example, the first electrical interface (140) and second electrical interface (201) may include peripheral component interconnect express (PCIe) edge card electrical interfaces. Further, in one example, the coupling structure is coupled to a print bar.

The specification and figures describe a mechanical fastener for an electrical interface may include a first handle and a second handle. The first handle and second handle are located on opposite sides of the mechanical fastener. The mechanical fastener may also include a first housing, a second housing coupled to the first housing, an electrical interface housed in the mechanical fastener between the first and second housings, a first lever intermediary between the first handle and the first housing and mechanically coupled to the second handle, a second lever intermediary between the second handle and the second housing and mechanically coupled to the first handle, a first post coupled to the first handle and the second lever, and a second post coupled to the second handle and the first lever. The mechanical fastener provides a quick, easy, and safe engagement and disengagement of an electrical interface. Further, the mechanical fastener provides tactile feedback to a user that indicates to the user when the electrical interface is completed. Still further, the mechanical fastener provides a hold open and hold closed feature in the interaction between the registration pillars, arched tracks and protrusions within the camlock connector.

The preceding description has been presented to illustrate and describe examples of the principles described. This description is not intended to be exhaustive or to limit these principles to any precise form disclosed. Many modifications and variations are possible in light of the above teaching.

What is claimed is:

1. A mechanical fastener with an electrical interface comprising:
   a first handle;

a second handle, the first handle and second handle being located on opposite sides of the mechanical fastener;
a first housing;
a second housing coupled to the first housing;
the electrical interface housed in the mechanical fastener between the first and second housings;
a first lever intermediary between the first handle and the first housing and mechanically coupled to the second handle;
a second lever intermediary between the second handle and the second housing and mechanically coupled to the first handle;
a first post coupled to the first handle and the second lever; and
a second post coupled to the second handle and the first lever.

2. The mechanical fastener of claim 1, wherein the first and second handles each comprise:
knurling located at a proximal end, the first and second posts being located at a distal end,
wherein the first and second posts couple to a main printed circuit board (PCB) housing during coupling of the mechanical fastener to the main PCB housing.

3. The mechanical fastener of claim 1, wherein the electrical interface comprises:
an intermediary printed circuit board (PCB);
a cable connector mechanically coupled to the intermediary PCB; and
a edge connector mechanically coupled to the intermediary PCB and communicatively coupled to the intermediary PCB.

4. The mechanical fastener of claim 1, wherein the electrical interface is a peripheral component interconnect express (PCIe) edge card electrical interface.

5. The mechanical fastener of claim 1, wherein each of the first and second handles comprise:
a registration pillar;
an arched track; and
a number of protrusions formed on the arched track,
wherein a first registration pillar coupled to the first handle interfaces with a second arched track and second set of protrusions formed on the second arched track of the second handle,
wherein a second registration pillar coupled to the second handle interfaces with a first arched track and first set of protrusions formed on the first arched track of the first handle, and
wherein the mechanical fastener provides haptic feedback, visual feedback, or combinations thereof via the interfaces between the registration pillars, the arched track, and the protrusions.

6. The mechanical fastener of claim 1, wherein during actuation, the first handle and second handle rotate in opposite directions relative to one another.

7. The mechanical fastener of claim 3, wherein at least one of the first and second housing comprises a ribbon cable aperture defined therein through which a ribbon cable couples to the ribbon cable connector.

8. A three-dimensional (3D) additive manufacturing apparatus comprising:
at least one material ejection device to eject material onto a print zone; and
an electrical interface system to electrically couple the material ejection device to control circuitry of the 3D additive manufacturing apparatus, the electrical interface system comprising:
a mechanical fastener, the mechanical fastener comprising:
a first handle;
a second handle, the first handle and second handle being located on opposite sides of the mechanical fastener and pivoting in opposite directions with respect to one another;
a first housing;
a second housing coupled to the first housing;
a first electrical interface housed in the mechanical fastener between the first and second housings;
a first lever between the first handle and the first housing and mechanically coupled to the second handle;
a second lever between the second handle and the second housing and mechanically coupled to the first handle;
a first post coupled to the first handle and the second lever; and
a second post coupled to the second handle and the first lever; and
a number of hooks formed in a housing of the material ejection device to which the mechanical fastener couples.

9. The apparatus of claim 8, wherein the hooks comprise:
a first hook formed in a coupling structure to which the mechanical fastener couples; and
a second hook formed in the coupling structure opposite from the first hook with respect to a second electrical interface of the coupling structure.

10. The apparatus of claim 9, wherein actuation of the mechanical fastener simultaneously causes the first and second posts to engage the first and second hooks and the first electrical interface to engage with the second electrical interface.

11. The apparatus of claim 10, wherein the first electrical interface and second electrical interface comprise peripheral component interconnect express (PCIe) edge card electrical interfaces.

12. The apparatus of claim 8, wherein the coupling structure is coupled to a print bar.

13. A camlock connector for an edge card electrical connector comprising:
two handles located on opposite sides of the camlock connector and pivotable about parallel axes in opposite directions relative to one another;
a housing;
an electrical interface housed within the housing; and
two cams coupled to each of the handles to transforming pivoting motion of the handles into movement of at least two posts coupled to the handles outward away from the housing and into an engaged position.

14. The camlock connector of claim 13, comprising:
a registration pillar formed on each of the two handles;
an arched track; and
a number of protrusions formed on the arched track,
wherein a first registration pillar coupled to the first handle interfaces with a second arched track and second set of protrusions formed on in the second arched track of the second handle,
wherein a second registration pillar coupled to the second handle interfaces with a first arched track and first set of protrusions formed on the first arched track of the first handle, and wherein the mechanical fastener provides haptic feedback, visual feedback, or combinations thereof via the interfaces between the registration pillars, the arched track, and the protrusions.

15. The camlock connector of claim 13, wherein the housing comprises a ribbon cable aperture defined therein through which a ribbon cable couples to the electrical interface.

16. The camlock connector of claim 13, wherein the engaged position comprises hooks into which the posts are engaged.

17. The camlock connector of claim 13, wherein the housing comprises two opposing halves, each half having two rings of different sizes such that a smaller ring on each half is received within a lager ring on the other half when the halves are assembled around the electrical interface.

18. The camlock connector of claim 13, wherein the electrical interface comprises a printed circuit assembly having two recesses that accommodate the rings on the two halves of the housing when engaged.

19. The camlock connector of claim 13, wherein the housing comprises a slot aperture to accommodate cables electrically connected to the electrical interface.

20. The camlock connector of claim 13, wherein a cam lever on each handle includes a buttress end to seat in a buttress recess to limit rotation of the respective handle.

\* \* \* \* \*